US005819525A

United States Patent [19]

Gaul et al.

[11] Patent Number: 5,819,525

[45] Date of Patent: Oct. 13, 1998

[54] COOLING SUPPLY MANIFOLD ASSEMBLY FOR COOLING COMBUSTION TURBINE COMPONENTS

[75] Inventors: Gregory Robert Gaul, Oviedo; Leroy Dixon McLaurin, Winter Springs, both of Fla.

[73] Assignee: Westinghouse Electric Corporation, Pittsburgh, Pa.

[21] Appl. No.: 818,812

[22] Filed: Mar. 14, 1997

[51] Int. Cl.$^{6}$ .......... F02C 7/12

[52] U.S. Cl. .......... 60/39.75; 415/115

[58] Field of Search .......... 60/39.07, 39.75, 60/39.83; 415/114, 115, 116, 117

[56] References Cited

U.S. PATENT DOCUMENTS

| | | | |
|---|---|---|---|
| 3,756,020 | 9/1973 | Moskowitz et al. | 60/39.66 |
| 3,972,181 | 8/1976 | Swayne | 60/39.66 |
| 4,053,254 | 10/1977 | Chaplin et al. | 415/116 |
| 4,164,846 | 8/1979 | Moskowitz et al. | 60/39.46 |
| 4,492,517 | 1/1985 | Klompas | 415/115 |
| 4,719,748 | 1/1988 | Davis, Jr. et al. | 60/39.37 |
| 4,982,564 | 1/1991 | Hines | 60/39.55 |
| 5,100,291 | 3/1992 | Glover | 415/115 |
| 5,253,976 | 10/1993 | Cunha | 415/114 |
| 5,317,877 | 6/1994 | Stuart | 60/736 |
| 5,394,687 | 3/1995 | Chen et al. | 60/39.07 |
| 5,491,971 | 2/1996 | Tomlinson et al. | 60/39.182 |
| 5,536,143 | 7/1996 | Jacala et al. | 416/96 |
| 5,611,197 | 3/1997 | Bunker | 60/39.75 |

*Primary Examiner*—Louis J. Casaregola
*Attorney, Agent, or Firm*—D. G. Maire

[57] ABSTRACT

A cooling manifold assembly for cooling combustion turbine components is provided. The manifold assembly comprises at least a first and second connector box. Each one of the first and second two connector boxes comprises a housing. A fluid supply conduit and return conduit are securely coupled with the housing. The fluid supply conduit is adapted to be in fluid communication with a cooling fluid for cooling a hot turbine part. The return conduit is adapted to be in fluid communication with a cooling fluid that has extracted heat from a turbine hot part. A cooling fluid supply pipe for supplying a cooling fluid to the first and second connector boxes is provided. The supply pipe comprises a side wall that defines a coolant flow channel with a first opening at a first end, and a second opening at a second end. The first end of the fluid supply pipe is mechanically coupled in fluid communication with the fluid supply conduit of the first connector box. The second end of the cooling fluid supply pipe is mechanically coupled in fluid communication with the fluid supply conduit of the at least second connector box. A fluid return pipe for conducting a cooling fluid that has extracted heat from a hot turbine part is provided. The return pipe comprises a side wall defining a return flow channel with a first opening at a first end and second opening at a second end.

3 Claims, 4 Drawing Sheets

COOLING SUPPLY MANIFOLD ASSEMBLY FOR COOLING COMBUSTION TURBINE COMPONENTS

FIELD OF THE INVENTION

The present invention relates generally to gas turbines, and more particularly to a manifold assembly for a closed-loop cooling system for a gas turbine.

BACKGROUND OF THE INVENTION

Combustion turbines comprise a casing for housing a compressor section, combustion section and turbine section. The compressor section comprises an inlet end and an outlet end. The combustion section comprises an inlet end and a combustor transition. The combustor transition is proximate the discharge end of the combustion section and comprises a wall that defines a flow channel that directs the working fluid into the turbine inlet end.

A supply of air is compressed in the compressor section and directed into the combustion section. The compressed air enters the combustion inlet and is mixed with fuel. The air/fuel mixture is then combusted to produce high temperature and high pressure gas. This gas is then ejected past the combustor transition and injected into the turbine section to run the turbine.

As those skilled in the art are aware, the maximum power output of a gas turbine is achieved by heating the gas flowing through the combustion section to as high a temperature as is feasible. The hot gas, however, heats the various turbine components that it passes when flowing through the turbine.

Accordingly, the ability to increase the combustion firing temperature is limited by the ability of the turbine components to withstand increased temperatures. Consequently, various cooling methods have been developed to cool turbine hot parts. These methods include open-loop air cooling techniques and closed-loop cooling systems.

Conventional open-loop air cooling techniques divert air from the compressor to the combustor transition to cool the transition. A series of cooling fluid channels are provided in the surface of the combustor transition for receiving the cooling fluid to cool the transition. The cooling fluid extracts heat from the wall of the transition and then transfers into the inner transition flow channel and merges with the working fluid flowing into the turbine section. One drawback to open-loop cooling systems is that it diverts much needed air from the compressor, e.g., a significant amount of air flow is needed to keep the flame temperature of the combustor low. Another drawback to open-loop cooling of a combustor transition is $No_x$ emissions. It is, therefore, desirable to provide a cooling system that does not divert air from the compressor and controls $No_x$ emissions.

Conventional turbine closed-loop cooling assemblies generally comprise a manifold, strain relief devices, such as piston rings or bellows, and a supply of cooling fluid located outside the turbine. The manifold typically comprises an outer casing. The strain relief devices are employed to connect the manifold outer casing proximate the component that must be cooled.

The closed-loop cooling manifolds receive cooling fluid from the source outside the turbine and distribute the cooling fluid circumferentially about the turbine casing. Unlike open-loop cooling systems, the closed-loop cooling fluid remains separated from the working fluid that flows through the transition flow channel. Instead, the closed-loop cooling fluid is diverted to a location outside the turbine.

Conventional closed-loop cooling systems, however, employ relatively complex manifold attachment assemblies.

These manifold attachment assemblies, in turn, add to the overall expense of maintaining a combustion turbine. Conventional manifold attachment assemblies must be precisely designed to enable it to sufficiently couple with the turbine casing. It is, therefore, desirable to provide a more simplified and economical manifold attachment arrangement.

SUMMARY OF THE INVENTION

A cooling manifold assembly for cooling combustion turbine components is provided. The manifold assembly comprises at least a first and second connector box. Each one of the first and second connector boxes comprises a housing. A fluid supply conduit and return conduit are securely coupled with the housing The fluid supply conduit is adapted to be in fluid communication with a cooling fluid for cooling a hot turbine part. The return conduit is adapted to be in fluid communication with a cooling fluid that has extracted heat from a turbine hot part.

A cooling fluid supply pipe for supplying a cooling fluid to the first and second connector boxes is provided. The supply pipe comprises a side wall that defines a coolant flow channel with a first opening at a first end, and a second opening at a second end. The first end of the fluid supply pipe is mechanically coupled in fluid communication with the fluid supply conduit of the first connector box. The second end of the cooling fluid supply pipe is mechanically coupled in fluid communication with the fluid supply conduit of the at least second connector box.

A fluid return pipe for conducting a cooling fluid that has extracted heat from a hot turbine part is provided. The return pipe comprises a side wall defining a return flow channel with a first opening at a first end and second opening at a second end. The first end of the fluid return pipe is mechanically coupled in fluid communication with the fluid return conduit of the first connector box. The second end of the fluid return pipe is mechanically coupled in fluid communication with the fluid return conduit of the at least second connector box. In this manner, several connector boxes can be linked in series to cool sections of a hot turbine part.

DETAILED DESCRIPTION OF THE PREFERRED EMBODIMENT

Figure 1:
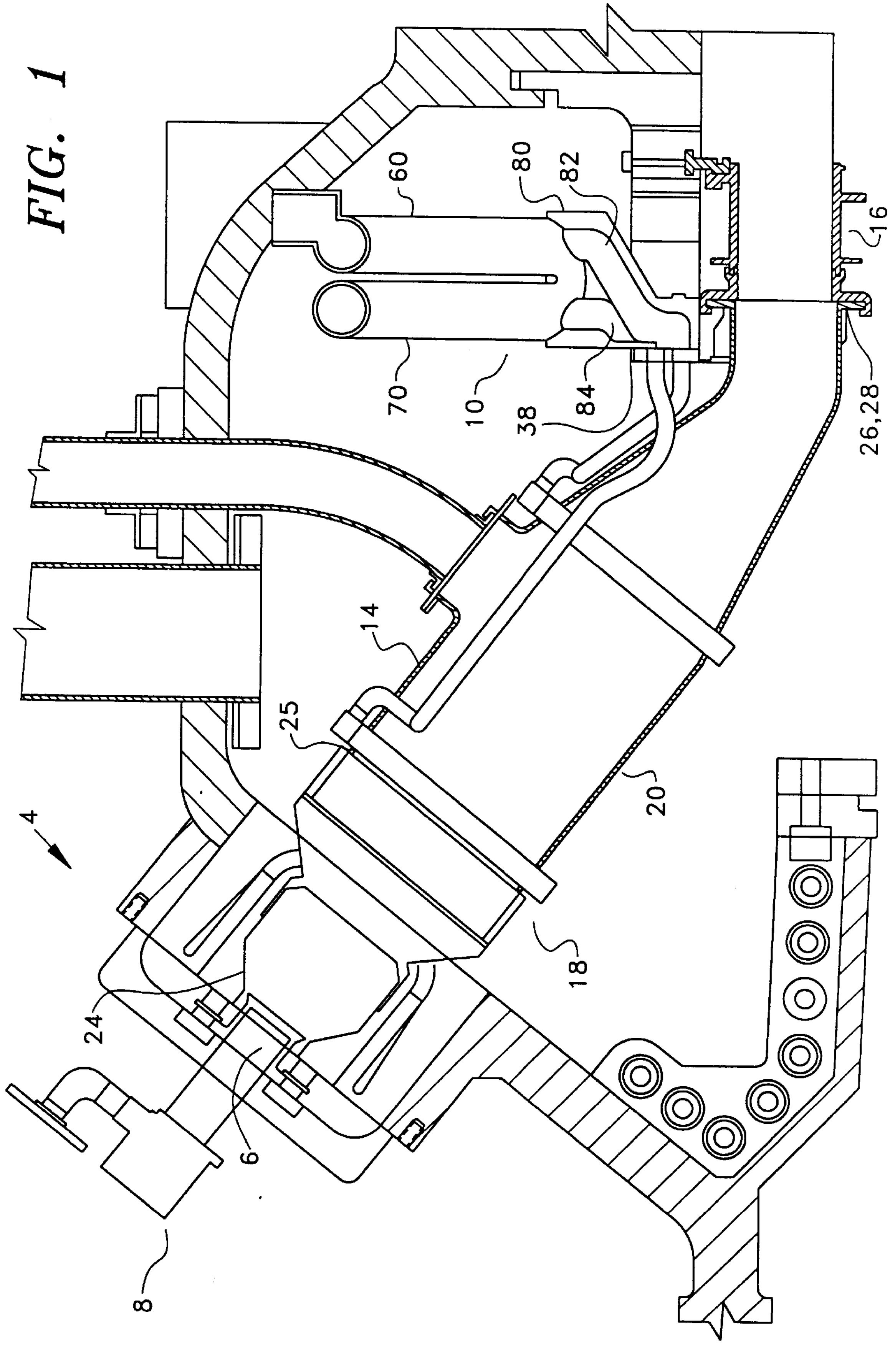
FIG. 1 is a cross-sectional view of the cooling manifold assembly mechanically coupled within a section of a combustion turbine in accordance with the present invention.

FIG. 1 generally shows the preferred embodiment of a cooling manifold assembly 10 attached within a combustion turbine 4. The cooling manifold assembly 10 is mechanically coupled between a combustion section 18 and a turbine section 16 for cooling a combustor transition 20. It is noted that the cooling manifold assembly may be employed to cool a turbine ring segment, stationary vane, or other circumferentially repeating stationary combustion turbine component. As an exemplary use, the following description addresses the manifold assembly 10 employed to cool the combustor transition 20.

The combustor 18 has an inlet end 24, combustor transition 20, combustor transition outlet end 26 and flange 38. The first stage of the turbine section 16 has an inlet end 28 for receiving a working fluid from the combustor transition 20. The cooling manifold assembly 10 has at least one connector box 80 for coupling the various cooling manifold assembly 10 components to the combustion turbine 4.

A nozzle 8 having a discharge end 6 is mechanically coupled with the combustor inlet end 24. The combustor transition outlet end 26 is mechanically coupled with the turbine section inlet end 28. The cooling manifold assembly 10 is mechanically coupled to the combustor transition 20 at the junction of the connector box 80 and the combustor transition flange 38. Additionally, the cooling manifold assembly 10 is in fluid communication with a cooling fluid supply source (not shown) outside of the combustion turbine 4. The cooling supply source is provided for supplying a cooling fluid to the manifold assembly 4 for cooling a hot part in a turbine, and preferably the combustor transition 20.

Figure 2:
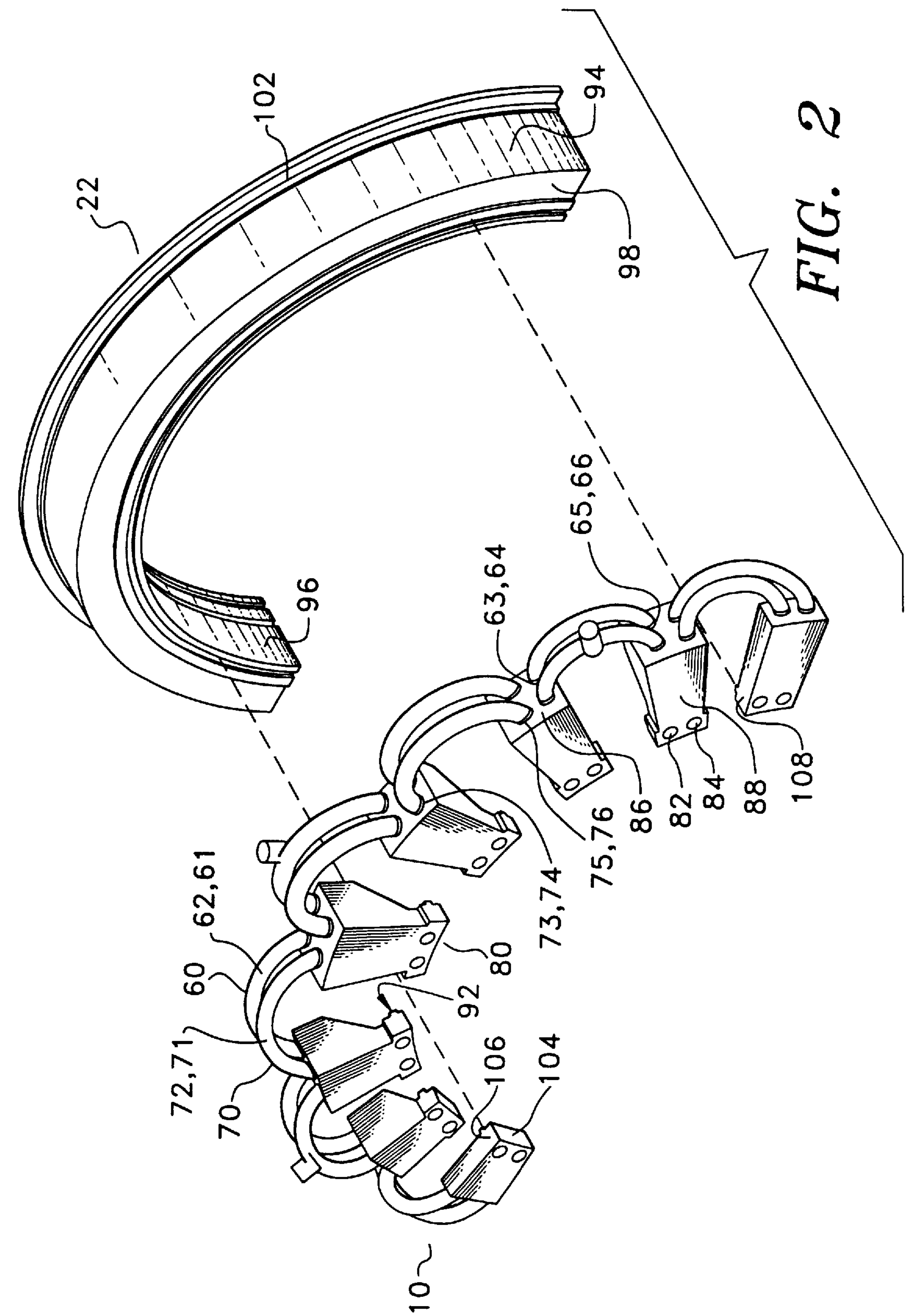
FIG. 2 is an exploded view of the cooling manifold assembly shown in FIG. 1.

FIG. 2 is an exploded view of the preferred embodiment of the cooling manifold assembly 10. The cooling manifold assembly 10 comprises a plurality of supply pipes 60, plurality of return pipes 70 and at least a first and second connector box 80. Eight connector boxes 80 are shown for cooling eight combustor transitions. Preferably, each supply pipe 60 and return pipe 70 has a generally arched cross-section.

A blade ring 22 for securely positioning each one of the connector boxes 80 proximate a combustion transition 20 is provided. The blade ring 22 comprises an outer surface 94, inner surface 96, and a rim 98 therebetween. Additionally, the blade ring 22 has flange 102. The blade ring extends circumferentially for approximately 180 degrees.

Each connector box 80 comprises a housing 81, a supply conduit 82 and a return conduit 84. Preferably, the housing 81 defines six faces, 86, 88, 92, 104, 106, and 108 and houses the supply conduit 82 and return conduit 84. The first face 86 is adapted to be mechanically coupled in fluid communication with a supply pipe 60 and return pipe 70. The second face 88 is adapted to be mechanically coupled in fluid communication with the turbine component that is to be cooled during combustion turbine operation.

When the combustion transition 20 is to be cooled, the second face 88 is adapted to be bolted to the flange 38 of the combustor transition, and the third housing face 92 is adapted to securely couple with the blade ring 22. The method of coupling each supply pipe 60 and return pipe 70 with each face is described below.

Each supply pipe 60 has a side wall 62. The side wall 62 defines a coolant flow channel 61 therebetween. The coolant flow channel 61 has a first end 63 having a first opening 64, and second end 65 with a second opening 66. The first end 63 of the supply pipe 60 is adapted to be mechanically coupled in fluid communication with the first face 86 of one connector box 80, while the second end 65 of the same supply pipe 60 is adapted to be mechanically coupled in fluid communication with the first face 86 of an adjacent connector box 80. The supply pipe 60 may be welded in place or by any other acceptable coupling means known in the art.

Each return pipe 70 has a side wall 72 that defines a return flow channel 71 therebetween. The return flow channel 71 has a first end 73 having a first opening 74, and second end 75 with a second opening 76. The first end 73 of the return pipe 70 is adapted to be mechanically coupled in fluid communication with the first face 86 of one connector box 80, while the second end 75 of the same return pipe 70 is adapted to be mechanically coupled in fluid communication with the first face 86 of an adjacent connector box 80. The return pipes 70 may be mechanically coupled with each corresponding component in the same manner as the supply pipes 60.

Figure 3:
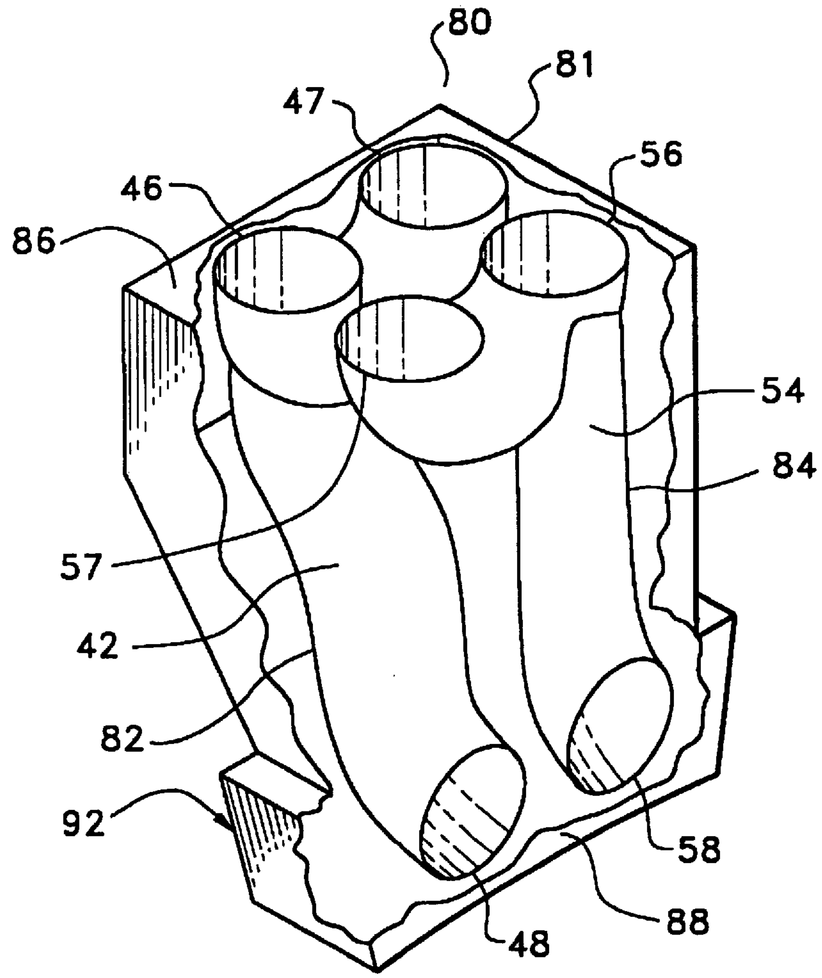
FIG. 3 is a cut-out view of the connector box shown in FIG. 1.

FIG. 3 shows a connector box 80 in more detail. The connector box housing 81 houses a supply conduit 82 and return conduit 84. The first face 86, second face 88, and third face 92 of the housing 81 are shown partially cut away to illustrate the preferred positioning of the supply conduit 82 and return conduit 84 within the housing 81.

The supply conduit 82 comprises a side wall 44 with a first open end 46, second open end 47, and third open end 48. The side wall 44 extends beginning from the first open end 46 to the second open end 47 and then in a relatively downwardly direction to the third open end 48. The first open end 46 is adapted to be mechanically coupled in fluid communication with the first end 63 of one supply pipe 60.

The second open end 47 is adapted to be mechanically coupled in fluid communication with the second end 65 of another supply pipe 60. The third open end 48 is adapted to be mechanically coupled in fluid communication with a turbine component that must be cooled during turbine operation. When cooling a combustor transition 20, the third open end 48 is preferably adapted to be coupled with the flange 38 of the combustor transition 20.

The return conduit 84 comprises a side wall 54 with a first open end 56, second open end 57, and third open end 58. The side wall 54 extends beginning from the first open end 56 to the second open end 57 and then in a relatively downwardly direction to the third open end 58. The first open end 56 is adapted to be mechanically coupled in fluid communication with the first end 73 of one return pipe 70. The second open end 57 is adapted to be mechanically coupled in fluid communication with the second end 75 of another return pipe 70. The third open end 58 is adapted to be mechanically coupled in fluid communication with the turbine component that may be cooled during turbine operation. When cooling a combustor transition 20, the third open end 58 is preferably adapted to be coupled with the flange 38 of the combustor transition 20.

Preferably, the first face 86 of the housing 81 is adapted to receive the supply conduit first open end 46 and second open end 47. The first face 86 of the housing 81 is also adapted to receive the return conduit first open end 56 and second open end 57. The second face 88 of the housing is adapted to receive the third open end 48 of the supply conduit 82 and the third open end 58 of the return conduit 84. The third open end 48 of the housing 81 is adapted to be coupled with the flange 38 of the combustor transition 20.

Figure 4:
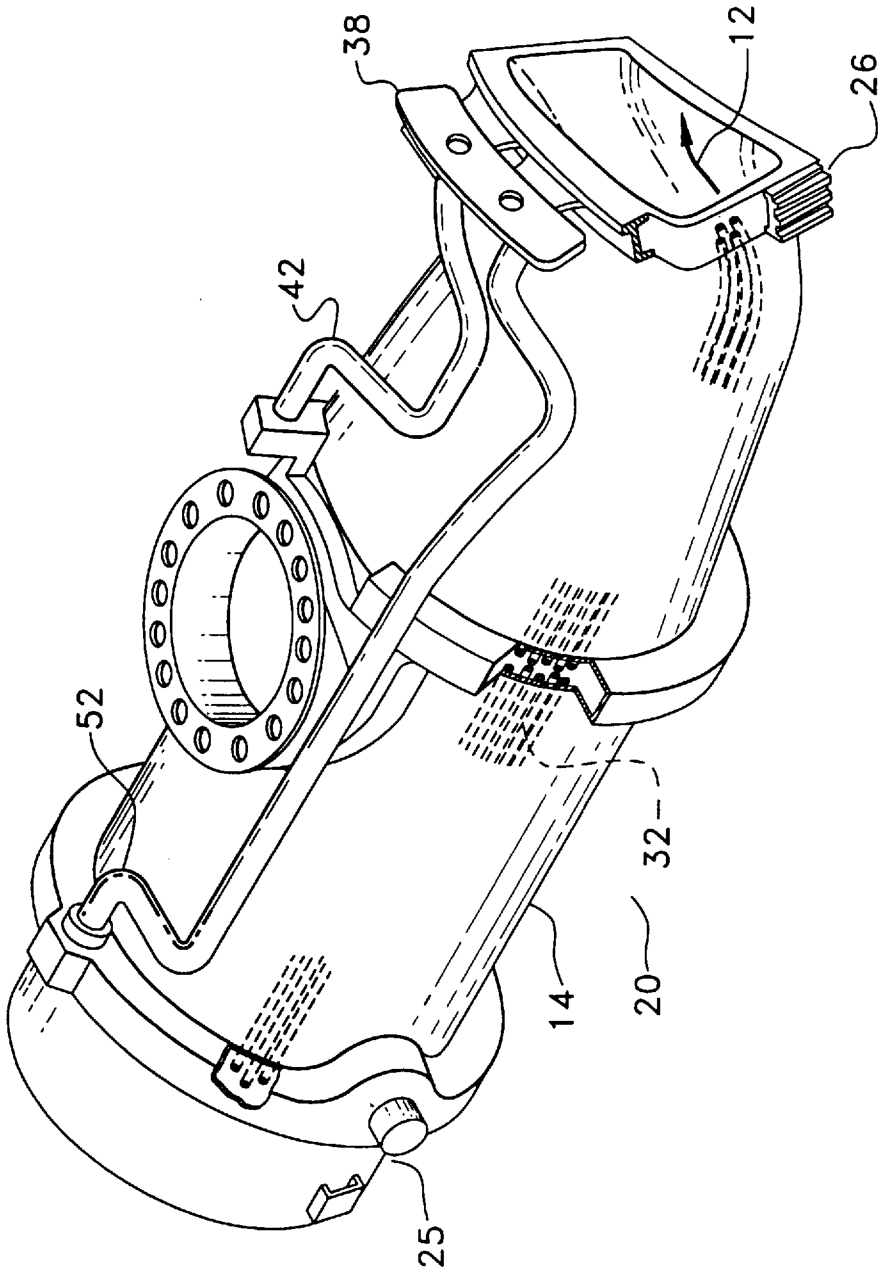
FIG. 4 is a perspective view of a combustor transition that can cooled when employing the cooling manifold assembly shown in FIG. 1.

FIG. 4 shows a combustor transition 20 that can be employed with the cooling manifold assembly 10. The combustor transition 20 comprises an outer wall 14 defining a working fluid flow channel 12. The combustor transition 20 further comprises an inlet end 25, outlet end 26, cooling channels 32, fluid supply duct 42, fluid return duct 52 and flange 38. The fluid ducts 42 and 52 are mechanically coupled in fluid communication with both the cooling channels 32 and combustor transition flange 38. The flange 38 is adapted to be mechanically coupled in fluid communication with the connector box 80.

The operation of the present invention will now be discussed in combination with the combustor transition 20 shown in FIG. 4. First, a combustion turbine 4 is started-up. Compressed air is injected into the combustor section 18 and mixed with a fuel to produce a working fluid. The working fluid is then injected into the turbine section 16 to run the turbine.

As the working fluid is produced, a cooling fluid supplied from a source outside of the combustion turbine is supplied to the manifold assembly 10. The cooling fluid can be at least either air or steam. The cooling fluid is conducted through each arched supply pipe 60 and into a corresponding connector box 80. Once entering the connector box 80, the cooling fluid travels through the fluid supply conduit 82 and into the fluid supply duct 42 and continues into the cooling channels 32.

As the cooling fluid travels through the cooling channels 32, the cooling fluid extracts heat from the combustor transition 20, thereby cooling the combustor transition hot parts and areas proximate the hot parts. The cooling fluid then travels to the fluid return duct 52 and into the fluid return conduit 84 of the same connector box 80 from which the cooling fluid originated. As the cooling fluid exits the fluid return conduit 84, the cooling fluid is received by the arched return pipes 70. The cooling fluid is then discharged from the combustion turbine.

The generally arched or semicircular, cross-sectional shape of both the supply pipes 60 and the return pipes 70 allows the cooling manifold assembly to be easily assembled and disassembled which, in turn, makes the invention more economical. Moreover, the arched-pipe design allows the manifold assembly 10 to withstand the thermal expansion caused by the coolant supply 40 and the coolant return 50 without creating unacceptable stresses in the supply pipes 60 or the return pipes 70.

In addition, because the arched pipes 60 and 70 are individual components and separate from the blade ring 22 and the turbine casing 36, the arched pipes 60 and 70 absorb the strain caused by the thermal expansion and do so without the need for strain relief devices.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

It is claimed:

1. A cooling manifold assembly for cooling combustion turbine components, the manifold assembly comprising:

at least a first and second connector box, each one of said first and second connector boxes comprising a housing, and a fluid supply conduit and return conduit housed in said housing, said fluid supply conduit adapted to be in fluid communication with a cooling fluid for cooling a hot turbine part, said return conduit adapted to be in fluid communication with a cooling fluid that has extracted heat from a turbine hot part;

a cooling fluid supply pipe for supplying a cooling fluid to said first and second connector boxes, said supply pipe comprising a side wall, said sidewall defining a coolant flow channel with a first opening at a first end and a second opening at a second end, said first end of said fluid supply pipe mechanically coupled in fluid communication with the fluid supply conduit of the first connector box, said second end of said cooling fluid supply pipe mechanically coupled in fluid communication with the fluid supply conduit of said at least second connector box; and a fluid return pipe for conducting a cooling fluid that has extracted heat from a hot turbine part out of a combustion turbine, said return pipe comprising a side wall defining a return flow channel with a first opening at a first end and second opening at a second end, said first end of said fluid return pipe mechanically coupled in fluid communication with the fluid return conduit of the first connector box, said second end of said fluid return pipe mechanically coupled in fluid communication with the fluid return conduit of said at least second connector box.

2. The combustion turbine, said combustion turbine comprising:

a cooling fluid supply for cooling the combustion turbine;

a compressor for compressing air;

a nozzle in fluid communication with said compressor, said nozzle adapted to inject fuel gas and air into a combustor;

a combustor in fluid communication with the nozzle for producing working fluid from the fuel gas and air mixture, said combustor comprising a combustor transition for directing said working fluid into a turbine section said combustor transition having a flange end adapted to be mechanically coupled in fluid communication with a cooling fluid supply pipe and fluid return pipe;

a turbine section mechanically coupled in fluid communication with said combustor transition for receiving the working fluid to run the turbine;

at least a first and second connector box mechanically coupled in fluid communication with the flange end of the combustor transition, each one of said first and second two connector boxes comprising a housing, and a fluid supply conduit and return conduit housed in said housing, said fluid supply conduit adapted to be in fluid communication with a cooling fluid for cooling the area proximate the combustor transition, said return conduit adapted to be in fluid communication with a cooling fluid that has extracted heat from an area proximate the combustor transition;

a cooling fluid supply pipe for supplying a cooling fluid to said first and second connector boxes, said cooling supply pipe in fluid communication with said cooling fluid supply, said supply pipe comprising a side wall, said sidewall defining a coolant flow channel with a first opening and a second opening, said first end of said fluid supply pipe mechanically coupled in fluid communication with the fluid supply conduit of the first connector box, said second end of said cooling fluid supply pipe mechanically coupled in fluid communication with the fluid supply conduit of said at least second connector box; and a fluid return pipe for conducting a cooling fluid that has extracted heat from the area proximate the combustor transition, said return pipe comprising a side wall defining a return flow channel with a first opening at a first end and second opening at a second end, said first end of said fluid return pipe mechanically coupled in fluid communication with the fluid return conduit of the first connector box, said second end of said fluid return pipe mechanically coupled in fluid communication with the fluid return conduit of said at least second connector box.

3. The assembly of claim 2 wherein said cooling fluid consists of either air or steam.

* * * * *

UNITED STATES PATENT AND TRADEMARK OFFICE

CERTIFICATE OF CORRRECTION

PATENT NO. : 5,819,525
DATED : Oct. 13, 1998
INVENTOR(S) : Gregory Robert Gaul, et al It is certified that error appears in the above-identified patent and that said Letters Patent is hereby corrected as shown below:

On title page, insert the following under item [56]:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 2 | 6 | 3 | 3 | 1 | 4 | 11/93 | Anderson | | | |
| | | | | | | | | | | | | | |

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION YES | TRANSLATION NO |
|---|---|---|---|---|---|---|---|---|---|---|---|---|---|---|
| | | 735 | 243 | A2 | | | | | 3/96 | EPO | | | | |
| | | | | | | | | | | | | | | |
| | | | | | | | | | | | | | | |

Signed and Sealed this

Tenth Day of August, 1999

Attest:

Q. TODD DICKINSON

*Attesting Officer*

*Acting Commissioner of Patents and Trademarks*

UNITED STATES PATENT AND TRADEMARK OFFICE

CERTIFICATE OF CORRECTION

PATENT NO. : 5,819,525 
DATED : October 13, 1998
INVENTOR(S) : Gregory Robert Gaul et al.

It is certified that error appears in the above-identified patent and that said Letters Patent is hereby corrected as shown below:

Column 1,
Line 4, after the title, the following should be inserted:

-- STATEMENT OF GOVERNMENT INTEREST

The United States government has rights under this invention pursuant to Department of Energy contract DE-FC21-95MC32267. --

Signed and Sealed this

Thirty-first Day of December, 2002

JAMES E. ROGAN
*Director of the United States Patent and Trademark Office*